United States Patent
Mukai et al.

(10) Patent No.: US 11,267,085 B2
(45) Date of Patent: Mar. 8, 2022

(54) SYSTEM AND METHOD FOR REPLACING THE TOP OF AN UNDER-DISPENSER CONTAINMENT (UDC) UNIT

(71) Applicant: S. BRAVO SYSTEMS, INC., Commerce, CA (US)

(72) Inventors: Don Mukai, Commerce, CA (US); Eric Emerson, Commerce, CA (US); Michael Oliva, Bardonia, NY (US)

(73) Assignee: S. Bravo Systems, Inc., Commerce, CA (US)

( * ) Notice: Subject to any disclaimer, the term of this patent is extended or adjusted under 35 U.S.C. 154(b) by 0 days.

(21) Appl. No.: 17/039,031

(22) Filed: Sep. 30, 2020

(65) Prior Publication Data

US 2021/0094131 A1    Apr. 1, 2021

Related U.S. Application Data

(60) Provisional application No. 62/908,304, filed on Sep. 30, 2019.

(51) Int. Cl.
| | |
|---|---|
| *B67D 7/78* | (2010.01) |
| *B23P 6/00* | (2006.01) |
| *B67D 7/84* | (2010.01) |
| *B67D 7/32* | (2010.01) |
| *B67D 7/04* | (2010.01) |

(52) U.S. Cl.
CPC ............... *B23P 6/00* (2013.01); *B67D 7/04* (2013.01); *B67D 7/3209* (2013.01); *B67D 7/78* (2013.01); *B67D 7/84* (2013.01)

(58) Field of Classification Search
CPC .......... B67D 7/04; B67D 7/3209; B67D 7/78; B67D 7/84
See application file for complete search history.

(56) References Cited

U.S. PATENT DOCUMENTS

| | | | | |
|---|---|---|---|---|
| 5,800,143 | A * | 9/1998 | Bravo | B67D 7/78 141/86 |
| 6,182,679 | B1 * | 2/2001 | Pendleton | B67D 7/78 137/68.14 |
| 8,714,397 | B2 * | 5/2014 | Bravo | B67D 7/3209 220/571 |
| 2005/0252932 | A1 * | 11/2005 | McCann | B67D 7/78 222/108 |

(Continued)

*Primary Examiner* — Paul J Gray
(74) *Attorney, Agent, or Firm* — Lewis Roca Rothgerber Christie LLP

(57) ABSTRACT

A system configured to replace a top portion of an under-dispenser containment unit embedded within a concrete island under a fuel dispenser. The system includes a mounting structure configured to be coupled to the top portion of the under-dispenser containment unit, and a dispenser sump top configured to be coupled to the mounting structure and the fuel dispenser. The mounting structure includes a series of angles and the dispenser sump top includes a frame having a pair of opposing end walls and a pair of opposing sidewalls, a central opening defined by the frame, a splash lip extending outward from a lower portion of each of the pair of opposing ends walls and the pair of opposing sidewalls, and a series of dispenser support flanges extending outward from an upper portion of the pair of opposing ends walls and the pair of opposing sidewalls.

8 Claims, 7 Drawing Sheets

(56) References Cited

U.S. PATENT DOCUMENTS

| | | | |
|---|---|---|---|
| 2010/0139807 A1* | 6/2010 | Boudry | B67D 7/3209 141/86 |
| 2010/0206393 A1* | 8/2010 | Saltz | H02G 9/10 137/312 |
| 2020/0071153 A1* | 3/2020 | Nelson | B67D 7/84 |

* cited by examiner

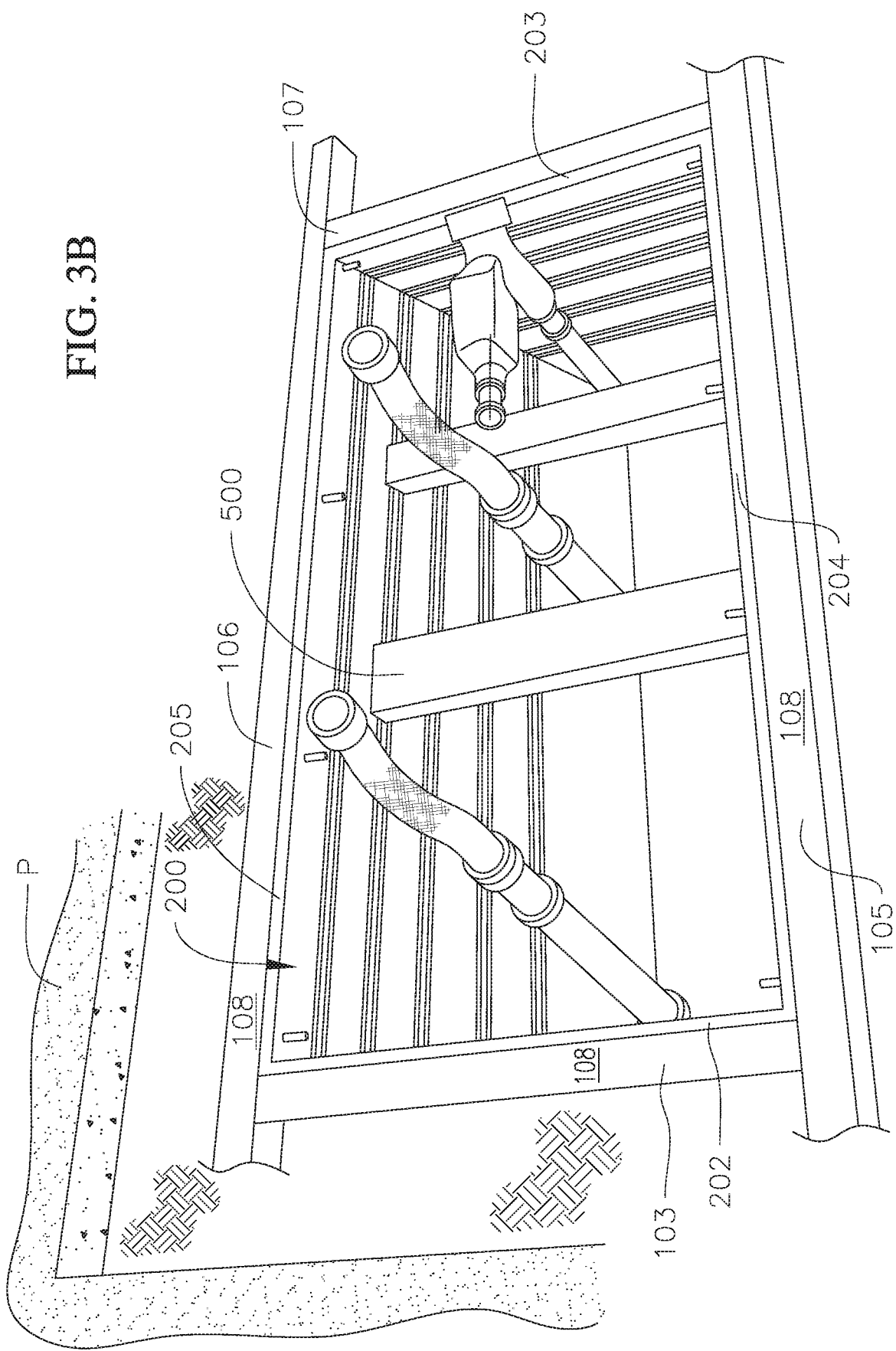

SYSTEM AND METHOD FOR REPLACING THE TOP OF AN UNDER-DISPENSER CONTAINMENT (UDC) UNIT

CROSS-REFERENCE TO RELATED APPLICATION

This application claims priority to and the benefit of U.S. Provisional Patent Application No. 62/908,304, filed Sep. 30, 2019, the entire contents of which are incorporated herein by reference.

BACKGROUND

1. Field

The present disclosure relates generally to systems and methods for replacing the top of an under-dispenser containment (UDC) unit.

2. Description of Related Art

Under-dispenser containment (UDC) units are provided under the fuel dispensers at gasoline service stations and other fueling facilities to contain and prevent contamination from fuel that leaks from the fuel dispensers. These UDC units are embedded within the concrete pad or island on which the fuel dispensers are supported. Additionally, fuel dispensers commonly rest on their own weight on the concrete pad without any anchoring or are secured only to the UDC unit. However, UDC units are typically prone to extensive rust damage, which may weaken or eliminate the connection between the fuel dispenser and the UDC unit and thereby create a safety hazard. For example, in the event of a car collision at the gasoline service station in which the connection between the fuel dispenser and the UDC unit has been weakened or eliminated due to rusting of the UDC unit, the fuel dispensers may be knocked over. Moreover, replacement of a UDC unit that is suffering from rusting or other excessive wear commonly requires excavation, removal, and replacement of the entire UDC unit, which is both labor intensive and costly.

SUMMARY

The present disclosure is directed to various embodiments of a system configured to replace a top portion of an under-dispenser containment (UDC) unit (e.g., a sump) embedded within a concrete island under a fuel dispenser. In one embodiment, the system includes a mounting structure including a series of angles configured to be coupled to the top portion of the under-dispenser containment unit, and a dispenser sump top configured to be coupled to the mounting structure and the fuel dispenser. The dispenser sump top includes a frame having a pair of opposing end walls and a pair of opposing sidewalls, a central opening defined by the frame, a splash lip extending outward from a lower portion of each of the pair of opposing ends walls and the pair of opposing sidewalls, and a series of dispenser support flanges extending outward from an upper portion of the pair of opposing ends walls and the pair of opposing sidewalls.

Each of the series of angles may include an attachment flange configured to be coupled to one of the end walls or one of the sidewalls, and a support flange extending outward from an upper end of the attachment flange. The support flange is configured to support a portion of the splash lip.

Each of the series of angles may be an L-bracket.

The series of angles may include a first pair of angles configured to be coupled to end walls of the under-dispenser containment unit and a second pair of angles configured to be coupled to sidewalls of the under-dispenser containment unit.

The support flange of each of the first pair of angles may have a first width, and the support flange of each of the second pair of angles may have a second width greater than the first width.

Each of the dispenser support flanges extending outward from the pair of opposing sidewalls of the frame may define a series of opening configured to receive fasteners securing the fuel dispenser to the dispenser sump top.

Each of the series of angles may include fiberglass.

Each of the series of dispenser support flanges may be spaced below an upper edge of the frame.

The present disclosure is also directed to various methods of replacing an upper portion of an under-dispenser containment (UDC) unit embedded within a concrete island surrounding a fuel dispenser at a gasoline service station. In one embodiment, the method includes removing at least a portion of the concrete pad and backfill immediately surrounding the under-dispenser containment unit to expose upper portions of sidewalls and end walls of the under-dispenser containment unit, inserting a brace into an interior chamber of under-dispenser containment unit, attaching a series of angles to the end walls and the sidewalls of the under-dispenser containment unit, each of the series of angles including an attachment flange and dispenser support flange extending outward from an upper end of the attachment flange, attaching a dispenser sump top to the series of angles, the dispenser sump top including a frame defining a central opening, a splash lip extending outward from a lower end portion of the frame, and a series of dispenser support flanges extending outward from an upper end portion of the frame, and attaching the fuel dispenser to the dispenser sump top.

The method may also include removing the fuel dispenser from the concrete island before removing at least a portion of the concrete pad and the backfill.

Attaching the series of angles may include substantially aligning the support flange of each of the series of angles with an upper edge of the under-dispenser containment unit, clamping the series of angles to the under-dispenser containment unit, drilling a series of holes through the series of angles and the under-dispenser containment unit, and inserting a series of fasteners through the series of holes.

Attaching the series of angles may also include applying adhesive and sealant between each of the series of angles and the under-dispenser containment unit; and applying adhesive and sealant to each of the series of fasteners.

Attaching the dispenser sump top to the series of angles may include sanding and cleaning an upper surface of the support flange of each of the series of angles, applying an adhesive on the upper surface of the support flange of each of the series of angles, positioning the splash lip of the dispenser sump top on the upper surface of the support flange of each of the series of angles, and allowing the adhesive to cure.

Each of the series of angles may include fiberglass.

The adhesive may be a polyurethane adhesive-sealant.

Inserting the brace into the interior chamber of the under-dispenser containment unit may include orienting the brace such that the brace extends from one sidewall to another sidewall of the pair of opposing sidewalls.

Inserting the brace into the interior chamber may remove deformations in the pair of opposing sidewalls.

The series of angles may include a first pair of angles configured to be coupled to the pair of opposing end walls of the under-dispenser containment unit and a second pair of angles configured to be coupled to the pair of opposing sidewalls of the under-dispenser containment unit. The support flange of each of the first pair of angles may have a first width, and the support flange of each of the second pair of angles may have a second width greater than the first width.

The method may also include cutting off a segment of each of the series of angles, before attaching the series of angles to the opposing pair of end walls and the opposing pair of sidewalls of the under-dispenser containment unit, such that a length of each of the first pair of angles substantially matches a length of each of the pair of opposing end walls and a length of each of the second pair of angles substantially matches a length of each of the pair of opposing sidewalls.

This summary is provided to introduce a selection of concepts that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

The features and advantages of embodiments of the present disclosure will be better understood by reference to the following detailed description when considered in conjunction with the accompanying figures. In the figures, like reference numerals are used throughout the figures to reference like features and components. The figures are not necessarily drawn to scale.

FIGS. 3A-3C are perspective views illustrating tasks of the method of replacing the top of the UDC unit according one embodiment of the present disclosure.

DETAILED DESCRIPTION

The present disclosure is related to various embodiments of systems and methods for replacing the top of an under-dispenser containment (UDC) unit. UDC units are typically embedded within a concrete pad or island surrounding a fuel dispenser at a gasoline service station or other fueling facility, and the UDC units are provided under the fuel dispenser to contain and prevent contamination from fuel that leaks from the fuel dispenser and associated components in the fuel dispenser, such as pipes, filters, fuel meters, and threaded pipe connections. The systems and methods of the present disclosure may be utilized to replace the top or upper portion of the UDC unit if it has corroded or otherwise degraded, which might create a hazardous condition in which the fuel dispenser is unsecured to the UDC unit and the concrete pad. The systems and methods of the present disclosure enable replacement of the top of the UDC without excavation and removal of the entire UDC unit. Additionally, the systems and methods of the present disclosure enable replacement of the top of the UDC unit while retaining the remaining portion of the UDC unit (e.g., the lower portion of the UDC unit that is not excavated).

Figure 1A:
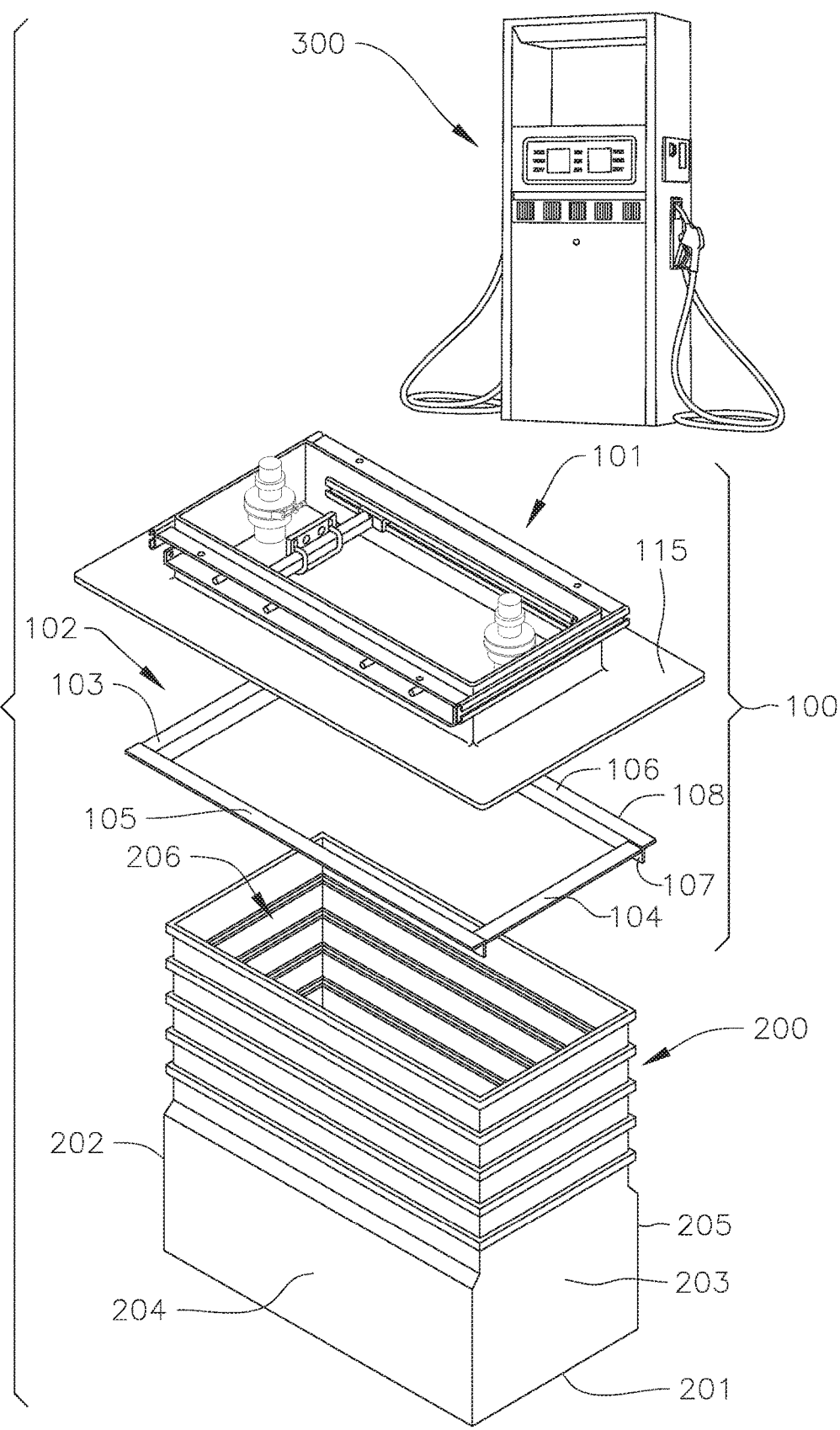
FIG. 1A is an exploded perspective view of a system configured to facilitate replacing a top of an under-dispenser containment (UDC) unit according to one embodiment of the present disclosure.
Figure 1B:
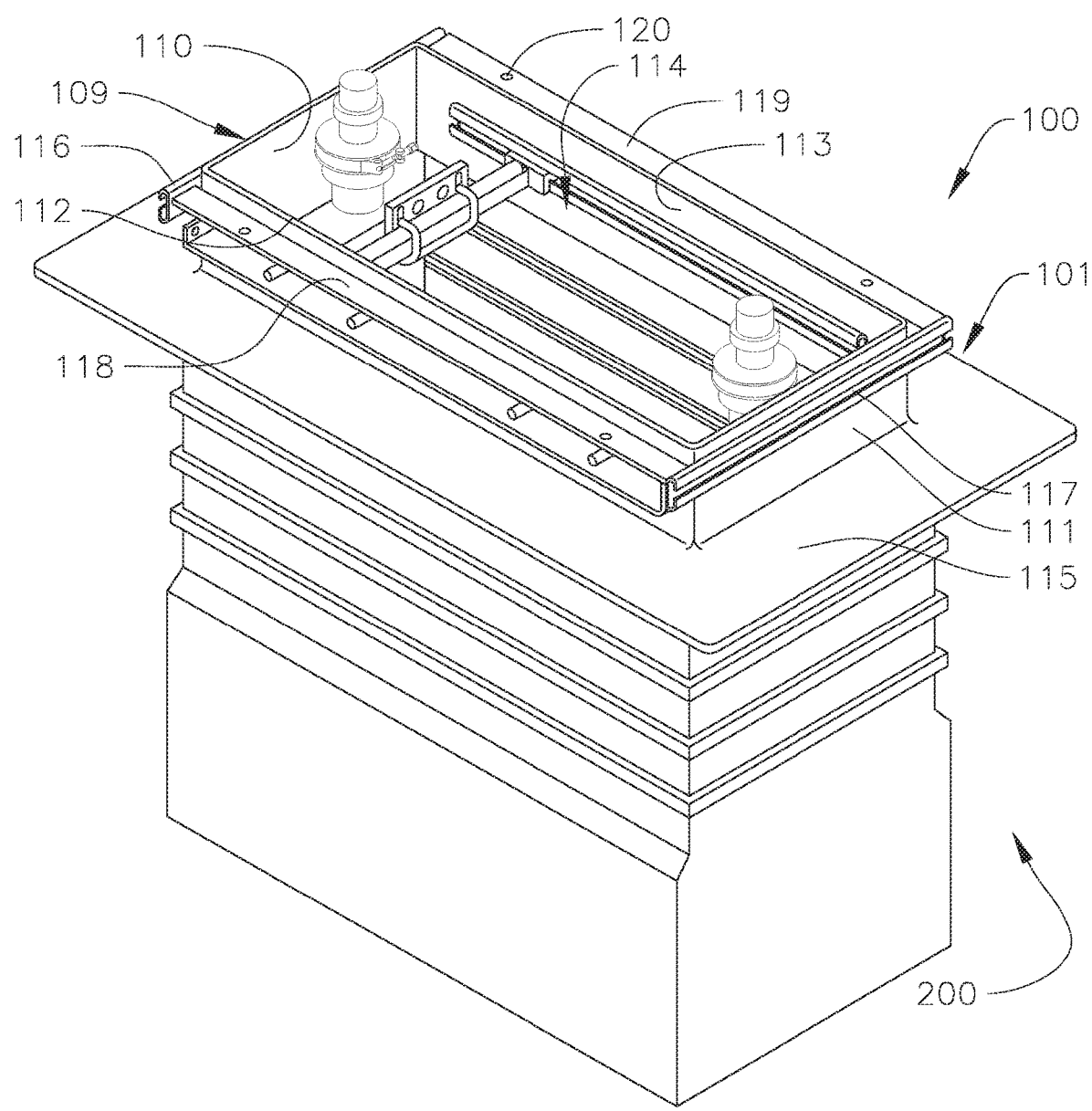
FIGS. 1B-1C are a perspective view and a cross-sectional view, respectively, of the embodiment of the system in FIG. 1A attached to the UDC unit according to one embodiment of the present disclosure.

With reference now to FIGS. 1A-1B, a system 100 for replacing the top or upper portion of a UDC unit 200 embedded within a concrete pad or island underneath a fuel dispenser 300 at a gasoline service station or other fueling facility. In the illustrated embodiment, the system 100 includes a dispenser sump top 101 configured to be coupled to the fuel dispenser 300, and a mounting structure 102 configured to attach the dispenser sump top 101 to the top or upper portion of the UDC unit 200. In the illustrated embodiment, the UDC unit 200 includes a base or bottom wall 201, a pair of opposing end walls 202, 203 extending upward from the bottom wall 201, and a pair of opposing sidewalls 204, 205 extending upward from the bottom wall 201. Additionally, in the illustrated embodiment, the end walls 202, 203 and the sidewalls 204, 205 are arranged in a rectangular configuration. Together, the end walls 202, 203, the sidewalls 204, 205, and the bottom wall 201 define an interior chamber 206 configured to collect fuel that leaks from the fuel dispenser 300 and associated components in the fuel dispenser 300. The end walls 202, 203 and the sidewalls 204, 205 also define an upper opening 207 in communication with the interior chamber 206 such that fuel leaking from the fuel dispenser 300 and the associated components in the fuel dispenser 300 can pass through the upper opening 207 and into the interior chamber 206.

In the illustrated embodiment, the mounting structure 102 includes series of angles 103, 104, 105, 106 configured to be coupled to the end walls 202, 203 and the sidewalls 204, 205, respectively, of the UDC unit 200. Although in the illustrated embodiment the number of angles 103, 104, 105, 106 in the mounting structure 102 is equal to the number of walls 202, 203, 204, 205 of the UDC unit 200, in one or more embodiments, the number of angles 103, 104, 105, 106 may be different than the number of walls 202, 203, 204, 205 of the UDC unit 200. For example, the number of angles 103, 104, 105, 106 in the mounting structure 102 may be greater than the number of walls 202, 203, 204, 205 of the UDC unit 200 such that two or more angles are provided along one or more of the walls 202, 203, 204, 205 of the UDC unit 200.

In the illustrated embodiment, each of the angles 103, 104, 105, 106 includes an attachment flange 107 and a support flange 108 extending outward from an upper end of the attachment flange 107. The attachment flange 107 of each of the angles 103, 104, 105, 106 is configured to be coupled to one of the walls 202, 203, 204, 205 of the UDC unit 200, and the support flange 108 of each of the angles 103, 104, 105, 106 is configured to extend outward from one of the walls 202, 203, 204, 205 of the UDC unit 200 and support a portion of the dispenser sump top 101. Although in the illustrated embodiment the attachment flange 107 of each of the angles 103, 104, 105, 106 is vertical or substantially vertical and the support flange 108 of each of the angles 103, 104, 105, 106 is horizontal or substantially horizontal (e.g., each of the angles 103, 104, 105, 106 is a 90-degree angle or L-shaped bracket), in one or more embodiments the angles 103, 104, 105, 106 may have any other suitable configuration depending, for instance, on the configuration of the UDC unit 200 and/or the configuration of the dispenser sump top 101. In one or more embodiments, the attachment flange 107 of each of the angles 103, 104, 105, 106 may have a height in a range from approximately 1 inch to approximately 4 inches (e.g., approximately 2 inches). In one or more embodiments, the support flanges 108 of the angles 103, 104 configured to be attached to the end walls 202, 203 of the UDC unit 200 may be narrower than the support flanges 108 of the angles 105, 106 configured to be attached to the sidewalls 204, 205 of the UDC unit 200. In one or more embodiments, the support flanges 108 of the angles 103, 104 configured to be attached to the end walls 202, 203 of the UDC unit 200 may have a width in a range from approximately 1 inch to approximately 3 inches (e.g., approximately 2 inches) and the support flanges 108 of the angles 105, 106 configured to be attached to the sidewalls 204, 205 of the UDC unit 200 may have a width in a range from approximately 2 inches to approximately 6 inches (e.g., approximately 4 inches).

As described in more detail below, the length of the angles 103, 104, 105, 106 may be longer than the length of the wall 202, 203, 204, 205 of the UDC unit 200 to which they are intended to be installed, and the angles 103, 104, 105, 106 may be cut to size to match or substantially match the lengths of the end walls 202, 203 and the sidewalls 204, 205 of the UDC unit 200 (e.g., the angles 103, 104, 105, 106 may be universal angles configured to work with any sized UDC unit 200). That is, a segment of the angles 103, 104, 105, 106 may be cut off such that the lengths of the angles 103, 104, 105, 106 match or substantially match the lengths of the end walls 202, 203 and the sidewalls 204, 205 of the UDC unit 200. In one or more embodiments, the length of the angles 103, 104 configured to be attached to the end walls 202, 203 of the UDC unit 200 may have a length in a range from approximately 20 inches to approximately 36 inches (e.g., approximately 28 inches) and the length of the angles 105, 106 configured to be attached to the sidewalls 204, 205 of the UDC unit 200 may have a length in a range from approximately 42 inches to approximately 66 inches (e.g., approximately 54 inches). In one or more embodiments, the angles 103, 104, 105, 106 may have any other suitable lengths depending on the configuration of the UDC unit that they are designed to work with. The angles 103, 104, 105, 106 may be made out of any suitable material, such as, for example, fiberglass.

In the illustrated embodiment, the dispenser sump top 101 includes a frame 109 having a pair of opposing end walls 110, 111 and a pair of opposing sidewalls 112, 113 arranged in a rectangular configuration. Together, the walls 110, 111, 112, 113 of the frame 109 define a central opening 114 configured to accommodate various components, such as, for instance, pipes, filters, fuel meters, and threaded pipe connections (e.g., one or more pipes passing from an underground storage tank (UST), into the UDC unit 200, and up through the central opening 114 to the fuel dispenser 300). In one or more embodiments, the central opening 114 may have a width in a range from approximately 12 inches to approximately 22 inches and a length in a range from approximately 32 inches to approximately 46 inches. In one or more embodiments, the central opening 108 may have a width of approximately 17 inches and a length of approximately 39 inches. In one or more embodiments, the frame 109 and the central opening 114 defined thereby may have any other suitable size depending on the size of the fuel dispenser 300.

Additionally, in the illustrated embodiment, the dispenser sump top 101 includes a splash lip 115 extending outward from a lower portion of each of the walls 110, 111, 112, 113 of the frame 109, and a series of dispenser support flanges 116, 117, 118, 119 extending outward from an upper portion of the walls 110, 111, 112, 113, respectively, of the frame 109. The mounting structure 102 (e.g., the angles 103, 104, 105, 106) is configured to support the splash lip 115 of the dispenser sump top 101, and the dispenser support flanges 116, 117, 118, 119 are configured to support and connect to the fuel dispenser 300. Additionally, in the illustrated embodiment, each of the dispenser support flanges 118, 119 connected to sidewalls 112, 113 of the frame 109 include a plurality of openings (e.g., holes) 120 configured to receive fasteners securing the fuel dispenser 300 to the dispenser support flanges 118, 119. In one or more embodiments, the splash lip 115 may have a width in a range from approximately 4 inches to approximately 10 inches. In one or more embodiments, the splash lip 115 may have any other suitable width or widths depending on the configuration of the UDC unit 200.

Figure 1C:
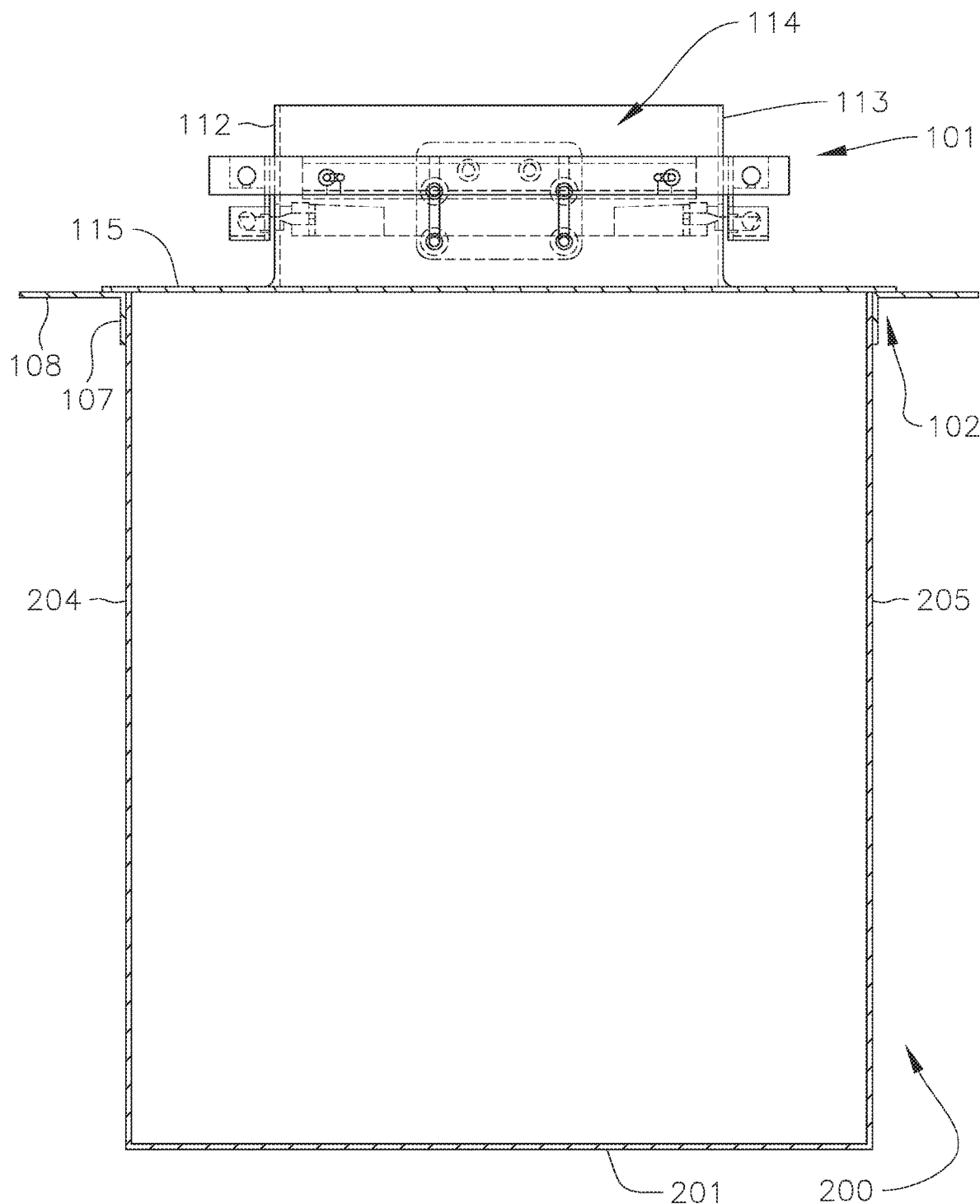

FIGS. 2 and 3A-3C illustrate tasks of a method 400 of replacing the top or upper portion of a UDC unit (e.g., UDC unit 200) embedded within a concrete pad or island P underneath a fuel dispenser (e.g., fuel dispenser 300) at a gasoline service station or other fueling facility according to one embodiment of the present disclosure. The method 400 may be utilized to replace the top or upper portion of the UDC unit 200 if it has corroded or otherwise degraded, which might create a hazardous condition in which the fuel dispenser 300 is unsecured to the UDC unit 200 and to the concrete pad or island P. Although the method 400 is described below with reference to the embodiment of the UDC unit 200 and the system 100 illustrated in FIGS. 1A-1C, in one or more embodiments the method 400 may be performed utilizing any other configuration of the system suitable for the configuration of the UDC unit and the fuel dispenser.

Figure 2:
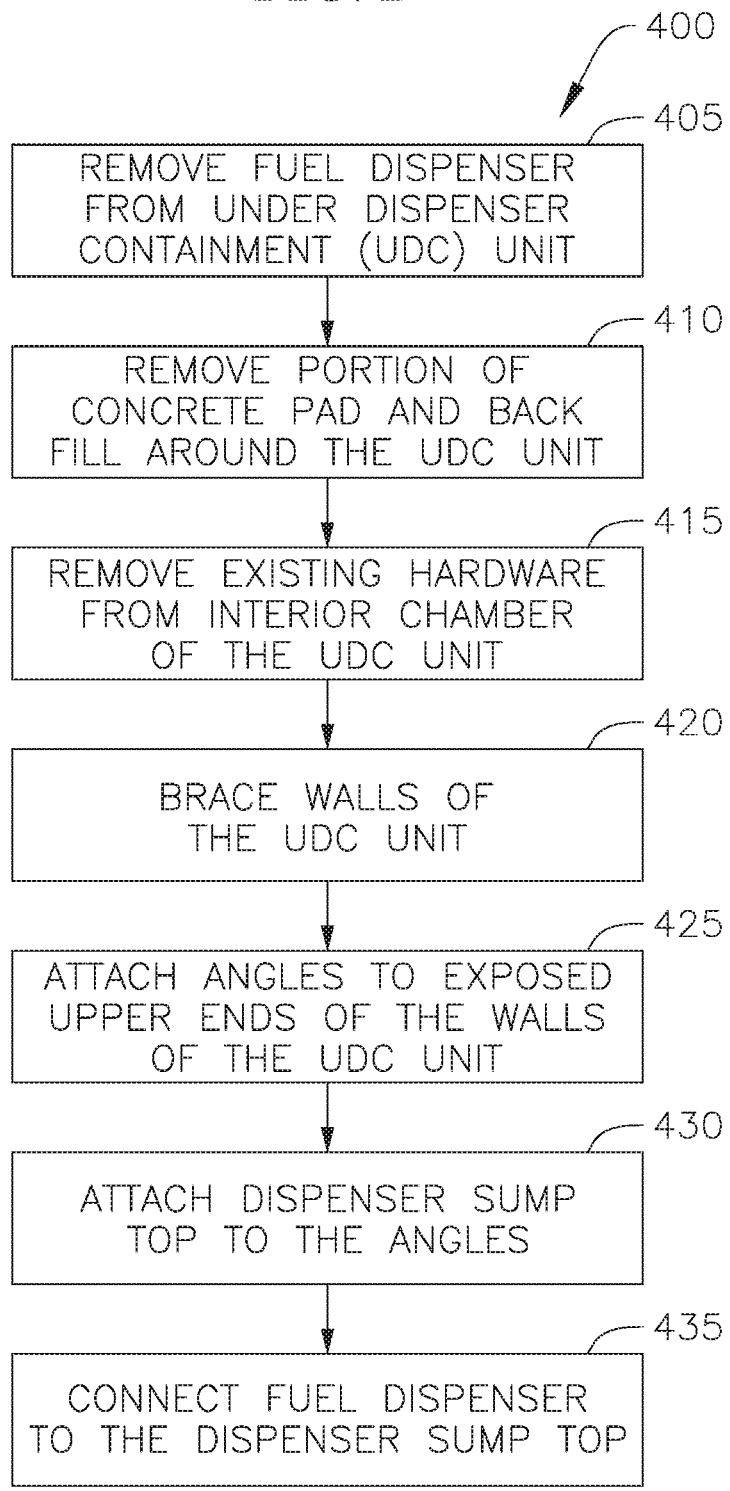
FIG. 2 is a flowchart illustrating tasks of a method of replacing the top of the UDC unit according to one embodiment of the present disclosure.
Figure 3A:
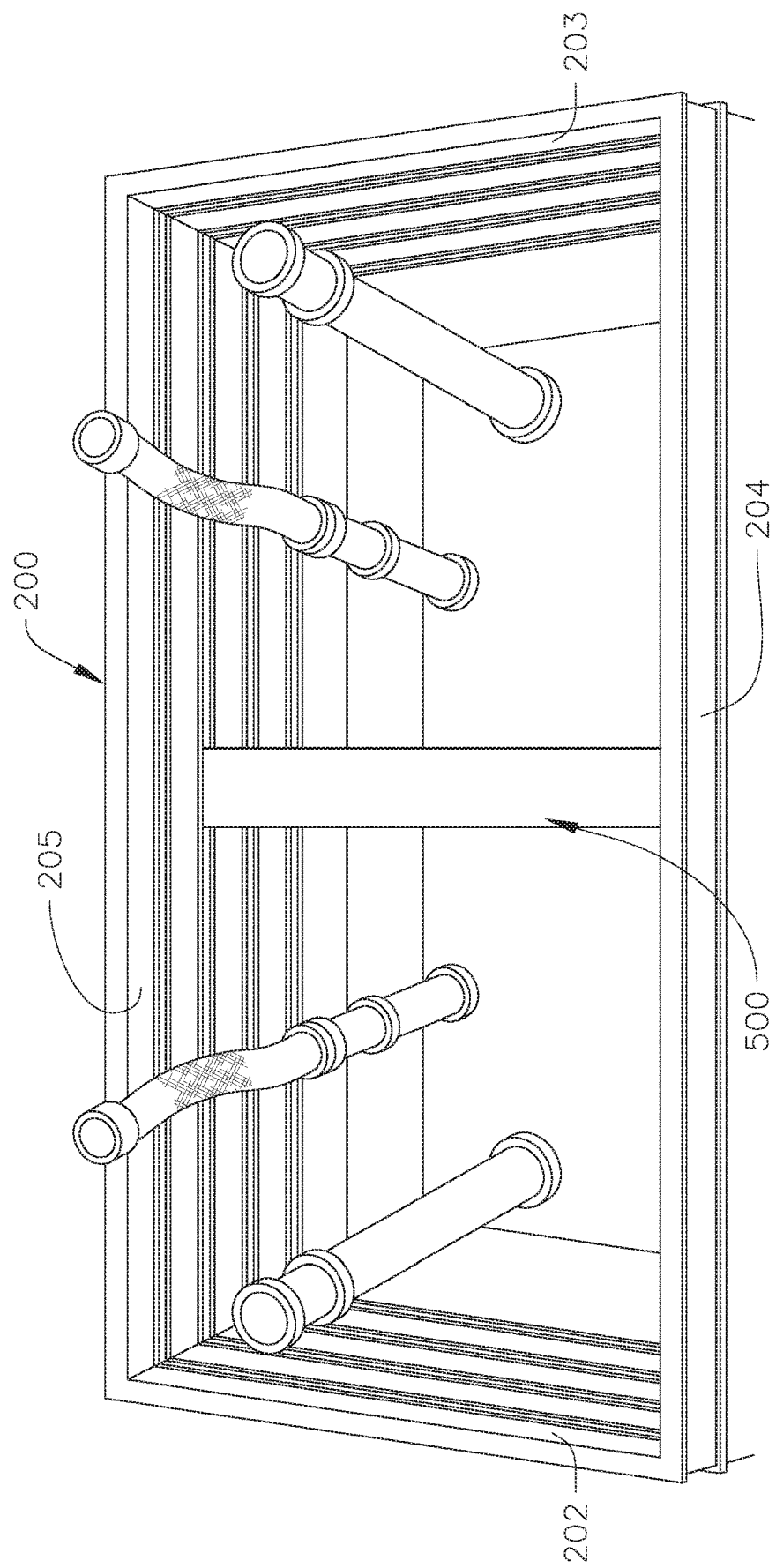
Figure 3C:
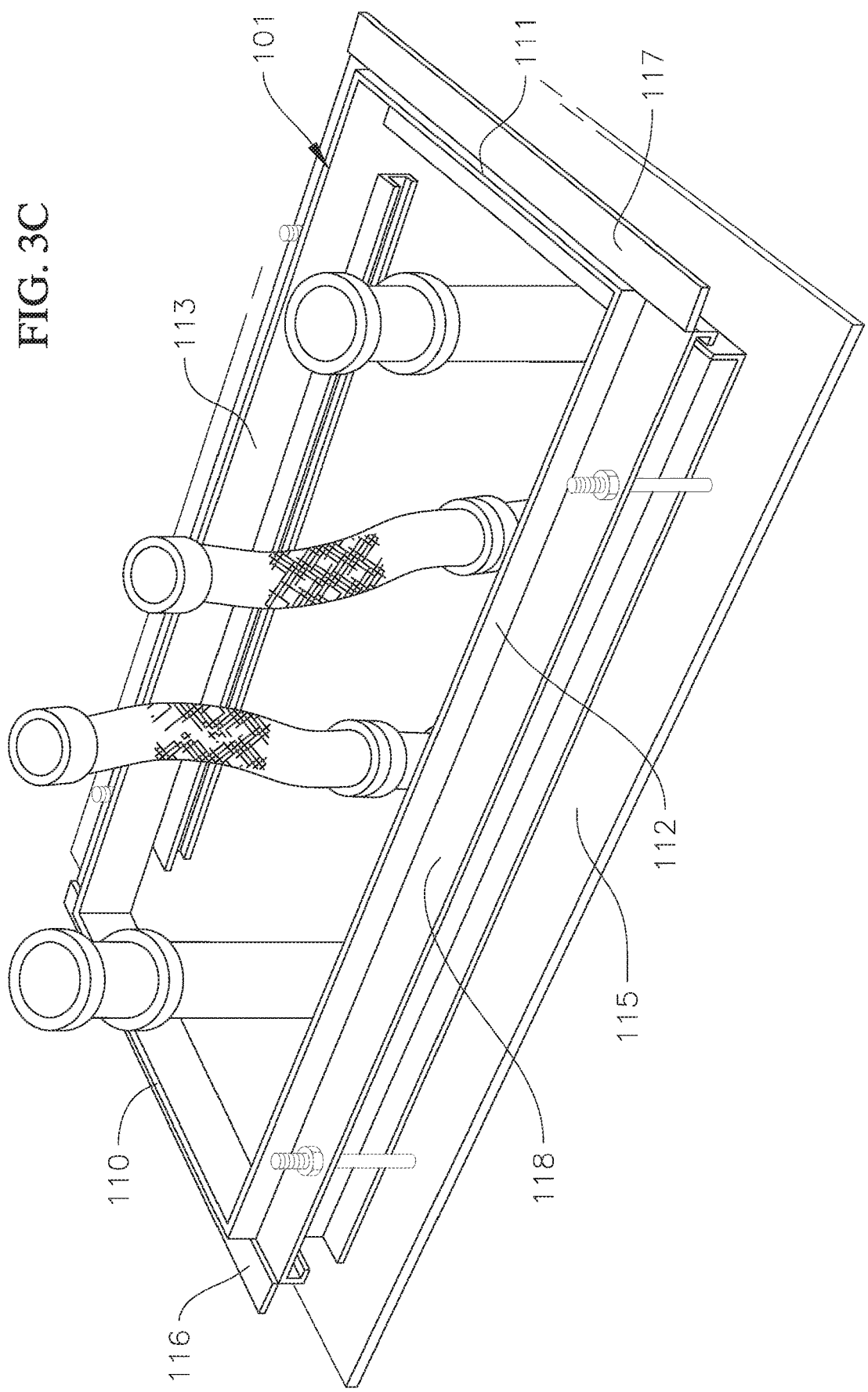

With reference now to FIGS. 2 and 3A, the method 400 includes a task 405 of removing the fuel dispenser 300 from the UDC unit 200 and the concrete pad or island P surrounding the UDC unit 200 to provide access to the UDC unit 200. In one or more embodiments, the method 400 may not include the task 405 of removing the fuel dispenser 300 if, for example, the fuel dispenser was previously removed or the fuel dispenser 300 became detached from the UDC unit 200 due to failure (e.g., corrosion of the upper portion of the UDC unit 200 that connects the UDC unit 200 to the fuel dispenser 300).

Additionally, in the illustrated embodiment, the method 400 includes a task 410 of removing at least a portion of the concrete pad or island P immediately surrounding the UDC unit 200, and removing the backfill (e.g., soil) and/or other debris immediately surrounding the UDC unit 200 to expose exterior surfaces of the upper portions of the end walls 202, 203 and the sidewalls 204, 205 of the UDC unit 200. The task 410 of removing the backfill surrounding the UDC unit 200 alleviates pressure on the upper portions of the end walls 202, 203 and the sidewalls 204, 205 of the UDC unit 200.

In the illustrated embodiment, the method 400 also includes a task 415 of removing existing hardware from the interior chamber 206 of the UDC unit 200, such as, for example, a unistrut and fasteners.

In the illustrated embodiment, the method 400 also includes a task 420 of bracing two or more of the walls 202, 203, 204, 205 of the UDC unit 200. In one or more embodiments, the task 420 of bracing two or more of the walls 202, 203, 204, 205 of the UDC unit 200 includes a task of inserting a brace 500 into the interior chamber 206 of the UDC unit 200 and orientating the brace 500 such that the brace 500 extends from one of the sidewalls 204 to the other sidewall 205. In one or more embodiments, the task 420 may include inserting the brace 500 into the interior chamber 206 and orienting the brace 500 such that the brace 500 extends from one of the end walls 202 to the other end wall 203. In one or more embodiments, the task 420 may include inserting a first brace into the interior chamber 206 and orienting the first brace such that the first brace extends from one of the end walls 202 to the other end wall 203, and inserting a second brace into the interior chamber 206 and orienting the second brace such that the second brace extends from one of the sidewalls 204 to the other sidewall 205. In one or more embodiments in which the UDC unit 200 is deformed or misshaped, the task 420 of bracing the UDC unit 200 is configured to return the UDC unit 200 approximately back to its original shape. For example, if one or more of the walls 202, 203, 204, 205 of the UDC unit 200 have become depressed inward such that the sidewalls 204, 205 are no longer parallel to each other and/or the end walls 202, 203 are no longer parallel to each other, installing the brace is configured to move the sidewalls 204, 205 and/or the end walls 202, 203 outward such that the end walls 202, 203 are approximately parallel to each other and the sidewalls 204, 205 are approximately parallel to each other. In this manner, the task 420 of bracing two or more of the walls 202, 203, 204, 205 of the UDC unit 200 is configured to remove or substantially remove deformations in the two or more walls 202, 203, 204, 205 that are braced. The task 420 of bracing two or more of the walls 202, 203, 204, 205 of the UDC unit 200 is also configured to prevent the end walls 202, 203 and/or the sidewalls 204, 205 from deforming inward during a subsequent task 425 of attaching the angles 103, 104, 105, 106 to the walls 202, 203, 204, 205 of the UDC unit 200. In one or more embodiments, the one or more braces 500 may be a piece of wood having a length equal or substantially equal to the width or the length of the interior chamber 206 of the UDC unit 200.

In the illustrated embodiment, the task 425 includes attaching the angles 103, 104, 105, 106 to the exposed outer surfaces of the upper ends of the end walls 202, 203 and the sidewalls 204, 205 of the UDC unit 200. In one or more embodiments, the task 425 of attaching the angles 103, 104, 105, 106 to the walls 202, 203, 204, 205 of the UDC unit 200 includes a task of temporarily clamping the angles 103, 104, 105, 106 to the walls 202, 203, 204, 205, respectively, of the UDC unit 200, a task of drilling holes (e.g., 13/64 inch holes) through the angles 103, 104, 105, 106 to the walls 202, 203, 204, 205 of the UDC unit 200, and a task of inserting fasteners (e.g., screwing self-tapping screws) through the holes from the exterior of the UDC unit 200. In one or more embodiments, the task 425 of attaching the angles 103, 104, 105, 106 to the walls 202, 203, 204, 205 to the UDC unit 200 may also include a task of applying a sealant and/or an adhesive (e.g., a polyurethane sealant and adhesive) over the fasteners from the interior and the exterior of the UDC unit 200, and applying a sealant and/or adhesive (e.g., a polyurethane sealant and adhesive) between the walls 202, 203, 204, 205 of the UDC unit 200 and the attachment flanges of the angles 103, 104, 105, 106. In the illustrated embodiment, following the task of attaching the angles 103, 104, 105, 106 to the walls 202, 203, 204, 205 of the UDC unit 200, the support flanges 108 of the angles 103, 104, 105, 106 are aligned or substantially aligned (e.g., flush or substantially flush) with upper edges of the walls 202, 203, 204, 205 of the UDC unit 200.

In the illustrated embodiment, the method 400 also includes a task 430 of attaching the dispenser sump top 101 to the angles 103, 104, 105, 106. In one or more embodiments, the task 430 of attaching the dispenser sump top 101 to the angles 103, 104, 105, 106 includes a task of sanding and cleaning upper surfaces of the support flanges 108 of the angles 103, 104, 105, 106, applying an adhesive on the upper surfaces of the support flanges 108 of the angles 103, 104, 105, 106, positioning the splash lip of the dispenser sump top 101 on the support flanges 108 of the angles 103, 104, 105, 106, and allowing the adhesive to cure. The cure time of the adhesive may vary depending on a variety of factors, such as, for instance, the ambient temperature and humidity. In one or more embodiments, the task 430 of attaching the dispenser sump top 101 to the angles 103, 104, 105, 106 includes applying downward pressure on the dispenser sump top 101 such that the adhesive oozes out between the splash lip 115 and the support flanges 108 of the angles 103, 104, 105, 106. If the adhesive oozes out between the splash lip 115 and the support flanges 108, the task 430 may include beading the oozing adhesive around the outer peripheral interface between the splash lip 115 and the support flanges 108 to create a liquid-tight or substantially liquid-tight seal between the splash lip 115 and the support flanges 108. Following the task 430 of attaching the dispenser sump top 101 to the angles 103, 104, 105, 106, the splash lip 115, or at least a portion thereof, is supported on and bonded to the support flanges 108 of the angles 103, 104, 105, 106.

In the illustrated embodiment, the method 400 also includes a task 435 of connecting the fuel dispenser 300 to the dispenser sump top 101. In one or more embodiments, the task 435 of connecting the fuel dispenser 300 to the dispenser sump top 101 includes a task of inserting fasteners through a flange on a lower end of the fuel dispenser 300 and through the openings in the support flanges 108 of the angles 103, 104, 105, 106, and threading nuts onto the ends of the fasteners.

In this manner, the above-described method 400 enables replacement of the top or upper portion of the UDC unit 200 without excavation and removal of the entire UDC unit 200 and it enables replacement of the top of the UDC unit 200 while retaining the remaining portion of the UDC unit 200 (e.g., the lower portion of the UDC unit 200 that is not excavated), both of which may save time, effort, and expense.

While this invention has been described in detail with particular references to embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention. Although relative terms such as "inner," "outer," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "approximately," "about," and similar terms are used as terms of approximation and not as terms of degree, and are intended to account for the inherent deviations in measured or calculated values that would be recognized by those of ordinary skill in the art. Moreover, the tasks described above may be performed in the order described or in any other suitable sequence. Additionally, the methods described above are not limited to the tasks described. Instead, for each embodiment, one or more of the tasks described above may be absent and/or additional tasks may be performed. Furthermore, as used herein, when a component is referred to as being "on" or "coupled to" another component, it can be directly on or attached to the other component or intervening components may be present therebetween. Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

What is claimed is:

1. A system configured to replace a top portion of an under-dispenser containment unit embedded within a concrete island under a fuel dispenser, the system comprising:
   a mounting structure configured to be coupled to the top portion of the under-dispenser containment unit, the mounting structure comprising a plurality of angles; and
   a dispenser sump top configured to be coupled to the mounting structure and the fuel dispenser, the dispenser sump top comprising:
      a frame comprising a pair of opposing end walls and a pair of opposing sidewalls;
      a central opening defined by the frame;
      a splash lip extending outward from a lower portion of each of the pair of opposing ends walls and the pair of opposing sidewalls; and
      a plurality of dispenser support flanges extending outward from an upper portion of the pair of opposing ends walls and the pair of opposing sidewalls,
   wherein, when the system is installed, the plurality of angles supports the dispenser sump top on the under-dispenser containment unit.

2. A system configured to replace a top portion of an under-dispenser containment unit embedded within a concrete island under a fuel dispenser, the system comprising:
   a mounting structure configured to be coupled to the top portion of the under-dispenser containment unit, the mounting structure comprising a plurality of angles; and
   a dispenser sump top configured to be coupled to the mounting structure and the fuel dispenser, the dispenser sump top comprising:
      a frame comprising a pair of opposing end walls and a pair of opposing sidewalls;
      a central opening defined by the frame;
      a splash lip extending outward from a lower portion of each of the pair of opposing ends walls and the pair of opposing sidewalls; and
      a plurality of dispenser support flanges extending outward from an upper portion of the pair of opposing ends walls and the pair of opposing sidewalls,
   wherein each of the plurality of angles comprises:
      an attachment flange configured to be coupled to one end wall of the pair of opposing end walls or one sidewall of the pair of opposing sidewalls; and
      a support flange extending outward from an upper end of the attachment flange, the support flange configured to support a portion of the splash lip of the dispenser sump top.

3. The system of claim 2, wherein each of the plurality of angles is an L-bracket.

4. The system of claim 2, wherein the plurality of angles comprises a first pair of angles configured to be coupled to the pair of opposing end walls of the under-dispenser containment unit and a second pair of angles configured to be coupled to the pair of opposing sidewalls of the under-dispenser containment unit.

5. The system of claim 4, wherein the support flange of each of the first pair of angles has a first width, and wherein the support flange of each of the second pair of angles has a second width greater than the first width.

6. The system of claim 4, wherein each of the plurality of dispenser support flanges extending outward from the pair of opposing sidewalls of the frame defines a plurality of openings configured to receive fasteners securing the fuel dispenser to the dispenser sump top.

7. The system of claim 1, wherein each of the plurality of angles comprises fiberglass.

8. The system of claim 1, wherein each of the plurality of dispenser support flanges is spaced below an upper edge of the frame.

* * * * *